Patented Sept. 12, 1933

1,926,424

UNITED STATES PATENT OFFICE 1,926,424

PRODUCTION OF VULCANIZATION PRODUCTS

Arthur Beck, Ludwigshafen-on-the-Rhine, and Hans Klein, Mannheim, Germany, assignors to I. G. Farbenindustrie Aktiengesellschaft, Frankfort-on-the-Main, Germany No Drawing. Application October 21, 1930, Serial No. 490,326, and in Germany November 1, 1929

8 Claims. (Cl. 106—23)

The present invention relates to improvements in the production of vulcanization products.

It has already been proposed to add stearic acid or a similar fatty acid, as a softening agent or, together with zinc oxide, as an activator for the vulcanization accelerator to rubber mixtures including mixtures of polymerization products of hydrocarbons of the butadiene series and mixtures of substances similar to rubber, such as guttapercha or balata, and it was assumed that the value of the products is increased with an increase in the number of carbon atoms of the fatty acid.

We have now found that stearic acid or similar softening agents can be advantageously replaced by the products obtained by the destructive oxidation of difficultly volatile paraffin hydrocarbons, such as liquid or solid paraffin wax or oils containing a preponderating quantity thereof, carried out for example by blowing the said materials with air or other gaseous oxidizing agents containing oxygen while warming for example in a vessel filled with filler bodies, such as Raschig rings, for example according to the British Patents Nos. 324,189 and 310,069 or to the German Patents Nos. 405,850 and 434,923, and which consist mainly of carboxylic acids, but are free from resins and/or asphaltic matter. Any asphaltic and resinous matter can be removed by distilling the oxidation products whereby the said impurities remain as the residue or the oxidation products may be subjected to an extraction with benzine, whereby the asphalts are not dissolved and can be filtered off if no other provision for separation be taken. Moreover, no asphalts are formed if the oxidation be carried out only to a certain extent say to about 50 per cent of the initial material. For many rubber mixtures, products having acid values as high as possible are especially suitable. It is therefore preferable to remove the neutral products from the crude oxidation products as far as possible, as for example by saponification and recovery of the acids from the pure soaps. The acid constituents of the oxidation products may be isolated in the form of their zinc salts and employed as such. The zinc salts have an equal or even better action than the free acids and the form in which the oxidation products are employed depends on the purpose for which the vulcanization products are intended. The quantities of the oxidation products employed are generally from 1 to 15 per cent of the quantity of rubber employed and in most cases from 2 to 10 per cent will give the best results. The products have excellent softening and, especially the strongly acid products, activating actions which are superior to those of stearic acid. Moreover, the rubber mixtures can be more easily worked on compounding and the vulcanized products show a higher strength than those prepared with the aid of stearic acid, though the acids of the oxidation products have a rather low number of carbon atoms the main constituents having from about 10 to 15 carbon atoms.

The following examples will further illustrate the nature of this invention, but the invention is not restricted to these examples. The parts are by weight.

Example 1

100 parts of smoked sheets, 4 parts of an oxidation product of hard paraffin wax (acid value 187.0, saponification value 224.8, iodine value 23.8, content of hydroxy carboxylic acids 0.6 per cent, unsaponifiable constituents 1.8 per cent), 40 parts of gas black, 5 parts of zinc oxide, 3 parts of sulphur, 1 part of the condensation product from aldol and α-naphthylamine, 0.6 part of diphenyl guanidine and 0.4 part of mercaptobenzothiazole are mixed on a roller. The mixture which is very readily prepared is then vulcanized for from 15 to 40 minutes at 141° C. Vulcanization products having excellent strength values are obtained which values are superior to those of a comparative sample with stearic acid. Thus within the aforesaid temperature range of vulcanization the following results can be obtained:

| Period of vulcanization (minutes) | Breaking load kilograms per sq. cm. with | | Breaking extension per cent with | |
|---|---|---|---|---|
| | Stearic acid | Oxidation product | Stearic acid | Oxidation product |
| 15 | 260 | 278 | 578 | 595 |
| 20 | 257 | 277 | 530 | 561 |
| 25 | 250 | 260 | 521 | 551 |
| 30 | 243 | 254 | 514 | 542 |
| 40 | 223 | 241 | 485 | 531 |

Example 2

100 parts of a polymerization product resembling India rubber and prepared from butadiene with the aid of sodium, 7 parts of the oxidation product of hard paraffin wax specified in Example 1, 70 parts of gas black, 1.5 parts of sulphur and 1.5 parts of dicyclohexylamine dithiocarbamic dicyclohexylamine are mixed on a roller. The mixture, which may be prepared extremely readily, is then vulcanized for 120 minutes at 141° C.

Vulcanization products are obtained having better strength properties than comparative vulcanization products prepared with the employment of stearic acid.

Example 3

A mixture composed according to Example 1 but containing 4 parts of the zinc salt of an oxidation product of paraffin wax instead of the said oxidation product of hard paraffin wax is prepared. Products having excellent properties are obtained by vulcanization for 40 minutes at 125° C., the breaking load being 287 kilograms per square centimetre and the breaking extension being 671 per cent in a test with a Schopper machine (see Schidrowitz, Rubber, 3rd ed. 1920, pages 278 to 280).

What we claim is:

1. As a composition a rubber mixture comprising a rubber and from 1 to 15 per cent its weight of a product obtained by the destructive oxidation of difficultly volatile paraffin hydrocarbons by means of a gaseous oxidizing agent containing oxygen which product contains substantial amounts of carboxylic acids, but is free from resinous and asphaltic matter.

2. As a composition a rubber mixture comprising a rubber and from 1 to 15 per cent its weight of a product obtained by the destructive oxidation of difficultly volatile paraffin hydrocarbons by means of a gaseous oxidizing agent containing oxygen which product consists of carboxylic acids, but is free from resinous and asphaltic matter.

3. As a composition a rubber mixture comprising a rubber and from 1 to 15 per cent its weight of a product obtained by the destructive oxidation of difficultly volatile paraffin hydrocarbons by means of a gaseous oxidizing agent containing oxygen which product consists of carboxylic acids, said product being in the form of zinc salts of the carboxylic acids, but being free from resinous and asphaltic matter.

4. As a composition a rubber mixture comprising a rubber and from 2 to 10 per cent its weight of a product obtained by the destructive oxidation of a paraffin wax by means of a gaseous oxidizing agent containing oxygen which product contains substantial amounts of carboxylic acids, but is free from resinous and asphaltic matter.

5. As a composition a vulcanizable rubber mixture comprising a rubber mixture comprising a rubber, from 2 to 10 per cent its weight of a product obtained by the destructive oxidation of a paraffin wax by means of air, which product consists of carboxylic acids, but is free from resinous and asphaltic matter, and a vulcanizing sulphur compound.

6. As a composition a vulcanizable rubber mixture comprising a rubber mixture comprising a rubber, from 2 to 10 per cent its weight of a product obtained by the destructive oxidation of a paraffin wax by means of air, which product consists of carboxylic acids, said product being in the form of zinc salts of the carboxylic acids, but being free from resinous and asphaltic matter, and a vulcanizing sulphur compound.

7. As a new article of manufacture a vulcanized rubber product comprising vulcanized rubber and from 1 to 15 per cent its weight of a product obtained by the destructive oxidation of difficultly volatile paraffin hydrocarbons by means of a gaseous oxidizing agent containing oxygen, which product contains substantial amounts of carboxylic acids, but is free from resinous and asphaltic matter.

8. As a new article of manufacture a vulcanized rubber product comprising vulcanized rubber and from 1 to 15 per cent its weight of a product obtained by the destructive oxidation of difficultly volatile paraffin hydrocarbons by means of a gaseous oxidizing agent containing oxygen, which product consists of carboxylic acids, said product being in the form of zinc salts of the carboxylic acids, but being free from resinous and asphaltic matter.

ARTHUR BECK.
HANS KLEIN.